(12) United States Patent
Thomas et al.

(10) Patent No.: US 6,798,409 B2
(45) Date of Patent: Sep. 28, 2004

(54) PROCESSING OF IMAGES FOR 3D DISPLAY

(75) Inventors: Graham Alexander Thomas, London (GB); Richard Fawconer Stevens, London (GB)

(73) Assignee: British Broadcasting Corporation, London (GB)

( * ) Notice: Subject to any disclaimer, the term of this patent is extended or adjusted under 35 U.S.C. 154(b) by 291 days.

(21) Appl. No.: 09/778,041

(22) Filed: Feb. 7, 2001

(65) Prior Publication Data

US 2001/0048507 A1 Dec. 6, 2001

(30) Foreign Application Priority Data

Feb. 7, 2000 (GB) ............................................. 0002771

(51) Int. Cl.$^7$ .............................................. G06T 15/20
(52) U.S. Cl. ...................... 345/427; 345/420; 345/424; 382/154
(58) Field of Search ................................ 345/419, 424, 345/428, 427, 502, 649, 173, 848, 420; 352/58, 57; 349/88, 5; 359/619; 382/154

(56) References Cited

U.S. PATENT DOCUMENTS

| | | | | |
|---|---|---|---|---|
| 4,685,070 | A | * 8/1987 | Flinchbaugh | ............... 345/424 |
| 5,013,147 | A | * 5/1991 | Montes | ......................... 352/58 |
| 5,680,185 | A | * 10/1997 | Kobayashi et al. | ........... 349/88 |
| 5,712,731 | A | * 1/1998 | Drinkwater et al. | ........ 359/619 |
| 6,134,338 | A | * 10/2000 | Solberg et al. | ............. 382/113 |
| 6,300,986 | B1 | * 10/2001 | Travis | ........................... 349/5 |
| 6,377,229 | B1 | * 4/2002 | Sullivan | ......................... 345/6 |
| 6,456,288 | B1 | * 9/2002 | Brockway et al. | ........... 345/428 |

FOREIGN PATENT DOCUMENTS

| | | |
|---|---|---|
| GB | 2272597 | 5/1894 |
| GB | 2206763 | 1/1989 |
| GB | 2273577 | 6/1994 |
| GB | 2296152 | 6/1996 |
| GB | 2316256 | 2/1998 |
| GB | 2325836 | 12/1998 |
| WO | WO 91/16664 | 10/1991 |
| WO | WO 95/34018 | 12/1995 |

OTHER PUBLICATIONS

"Design and applications of multiview 3D–LCD" by C. van Berkel et al, 1996 Euro Display Conference, Birmingham, Oct. 1996.

"Characterisation and optimisation of 3D–LCD module design" by C. van Berkel and J. Clarke, SPIE International Conference on Electronic Imaging, San Jose, Feb. 11–14, 1997.

"Examination of the requirements for autostereoscopic, full parallax, 3D TV" by McCormick et al. IBC '94, IEEE Conference Publication 397, Sep. 1994, pp. 477–482.

C.H. John Ju et al., "Mapping Arbitrary Projections for Volume Rendering onto an Array Processor", Proc. Int. Conf. On Application Specific Array Processors (ASAP 93) 25–27, Oct. 1993, pp. 160–163.

V. Ryan, "First Angle–Orthographic Projection", available from: http://www.technologystudent.com/designpro/ortho1.htm.

* cited by examiner

Primary Examiner—Mark Zimmerman
Assistant Examiner—Kimbinh T. Nguyen
(74) Attorney, Agent, or Firm—McDermott, Will & Emery

(57) ABSTRACT

A method and display are disclosed in which a representation of a 3D model is provided for presentation as a 3D image. The image may be presented under an array of spherical or lenticular microlenses so that different images are presented at different viewing angles. The images are rendered using a set of orthographic projections; this can avoid the need for multiple cameras or the highly computer intensive processing associated with generation of simulated camera images and can also give improved results as compared to prior art multiview images.

24 Claims, 5 Drawing Sheets

Microlenses and image obtained by multiplexing orthographic camera images

Pixels in image from camera A

Volume imaged by orthographic cameras (camera A shown shaded)

Position of display screen relative to 3D model

PROCESSING OF IMAGES FOR 3D DISPLAY

FIELD OF THE INVENTION

This invention relates to the field of 3D displays.

DESCRIPTION OF THE PRIOR ART

Autostereoscopic 3D displays are a well-known class of 3D display that can be viewed without needing to wear special glasses. The general principle is to ensure that the image seen on a display screen is dependant on the position of the viewer. At least two images are usually used, showing the desired view of the scene from two positions, corresponding to the positions of the left and right eye of the viewer for a limited range of head positions. The images are usually created by photographing a scene from positions corresponding to the centres of the intended eye positions. More than two images can be used, which allows a greater degree of head movement, whilst showing changes of parallax in the image, leading to increased realism. The images used for such a so-called multiview display are usually acquired by several cameras, each positioned so as to capture a view of the scene appropriate for the eye position at which the image is visible.

As an alternative to using several cameras, images may be generated using computer graphics techniques to render images equivalent to those that would be captured by a two or more real cameras. The process of rendering an image to simulate an image captured by a real camera is known as perspective projection. Images rendered in this way must of course exhibit the usual properties of images obtained from a conventional camera, specifically that objects appear smaller when they are a long way away, and the angle at which the scene is viewed varies slightly across the image, by an amount equal to the angular width and height of the image.

There are a number of known methods for realising an autostereoscopic display. For example, a sheet of lenticular lenses can be placed over a high-resolution display. The image underneath each lenticular lens is formed by taking one column of pixels from each image in turn, so that the display presents the viewer with each image in sequence as the viewer's head moves parallel to the image. This process is illustrated in FIG. 2. An example of this "multiview" approach is described in "Design and applications of multiview 3D-LCD" by C. van Berkel et al, 1996 EuroDisplay Conference, Birmingham, October 1996, and "Characterisation and optimisation of 3D-LCD module design" by C. van Berkel and J. Clarke, SPIE International Conference on Electronic Imaging, San Jose, Feb. 11–14, 1997. A set of conventional cameras is used to capture the images.

However, autostereoscopic displays based on these principles do not produce a fully accurate 3D representation of the scene; they merely presents the viewer with a number of discrete views.

One problem is that often, the viewer will be sufficiently close to the screen that one of his eyes is presented with parts of one image from microlenses on the left of the screen and parts of another image from microlenses on the right, due to the changing angle between the screen and the direction of view. These combined views will not represent an accurate portrayal of the scene. This is illustrated in FIG. 4. It is possible to minimise this effect by careful design of the display system to account for the variation of angle for a given viewing distance. An example of such a design is described in UK patent Application 2,272,597A (Sharp), which describes an arrangement of illumination elements and cylindrical lenses which ensure that a given observer sees a single view across the whole of the display. However, this will only work for observers at a certain range of distances.

There is a known method of generating an autostereoscopic display which makes, no assumptions about the position of the viewer, and is capable of reproducing a 3D scene with high accuracy. This method is known as Integral Imaging, an example of which is described by McCormick et al., "Examination of the requirements for autostereoscopic, full parallax, 3D TV", IBC '94, IEE Conference Publication 397, September 1994, pp.477–482, and WO-A-9534018. In this method, a special kind of camera captures an image which is 'replayed' by placing a sheet of microlenses over the image. The camera consists of an arrangement of lenses, which can be thought of as behaving like an array of very small cameras, one positioned at the location of each microlens. When the image is replayed, each microlens appears to have a colour and brightness that is a function of the angle at which it is viewed. The form of the image underneath the microlens array is such that the overall appearance is of a 3D image. The microlens array should ideally be composed of spherical microlenses, although lenticular lenses can also be used, in which case the image only exhibits parallax in the direction normal to the lenticular elements.

It is known that the image underneath the microlens array can be generated by a computer, rather than by a special kind of camera. This allows a 3D image of a computer model to be generated. However, techniques for doing this have involved ray tracing and simulation of the behaviour of the integral image camera, and are therefore complex and processor-intensive. For example, the image underneath each microlens can be computed by rendering an image of the scene from the viewpoint of that microlens, with an appropriate modification to allow objects that are on both sides of the image plane to be visible. For a typical microlens array consisting of, say 400 by 300 microlenses, this would require 120,000 separate rendering processes.

The present invention seeks to provide—in one of its forms—a method of allowing conventional image rendering hardware to be used efficiently to produce an image to place underneath the microlens array, whilst enabling an accurate 3D representation of the scene to be provided.

SUMMARY OF THE INVENTION

Accordingly, the present invention consists, in one aspect, in a method of providing a viewable representation of a 3D model, comprising the steps of identifying a set of different viewing angles and rendering from said model a set of orthographic projections corresponding respectively with said viewing angles.

It is important to note that the present invention uses orthographic projections. An image rendered using orthographic projection is unlike an image captured with a conventional camera; indeed it is impossible to capture such an image with a conventional camera. One fundamental difference is that the size of an object in an orthographic image projection is independent of its distance from the camera; in conventional perspective projection (or in a normal camera image), more distant objects appear smaller (the so-called perspective effect). This difference comes about because the angle at which the scene is viewed in an orthographic image is constant across the whole image. The field-of-view is specified in terms of the width and height of the rendered image (measured in units of distance, e.g. feet/meters), rather than by a horizontal and vertical field of view (measured in angular units e.g. degrees).

We have found that using orthographic images overcomes a major problem found with conventional multiview displays. Specifically, in such displays, as explained earlier, the property that determines which image is visible from a particular viewing position at any point on the screen is the angle between the screen and the direction of view of that point, as shown in FIG. 4. This will tend to result in several views being seen across the width of the display, which is an undesirable property if each view corresponds to a normal perspective camera image. As already mentioned, some displays have proposed modifications to the basic arrangements in an attempt to take account of the changing viewing angle across the display, for example the use of varying lens offsets across the display, as described for example in GB 2,272,597A.

In direct contrast to such complex prior methods of compensating for problems with conventional perspective images, the present invention uses orthographic images. This might at first seem unsatisfactory as the viewer should be presented with a "natural" perspective image. However, it has been appreciated according to the invention that the nature of a display will take account of the changing viewing angle of the viewer with respect to the display. Specifically, the display will allow portions of different orthographically-rendered images to be visible across the display from a given viewing point. Since the viewing angle is constant across each orthographic image, but differs from one orthographic image to another, the changing viewing angle automatically provides the correct parameter to control the selection of which image is seen. It has been appreciated that this is precisely what is needed to create a natural (perspective) image from the viewpoint of an observer, tailored to the particular location of the observer. Thus, although the individual images rendered are orthographic, what the viewer will actually see will appear to have the correct perspective.

A further advantage is that the orthographic projections may be rendered efficiently. Firstly, orthographic projections may be simpler to perform than perspective projections, as the distance from the source does not need to be taken into account. In a preferred arrangement, a greater benefit is that the number of rendering processes may be equal to the number of viewpoints, typically equal to the number of pixels under each micro lens, and this will normally be smaller than the total number of lenses. For example, in a lenticular display with a resolution of 1024×768 and 64 horizontal viewing angles, nearly a million rendering operations would be required with conventional processing but only 64 rendering operations may be required with an embodiment, a saving of better than 10,000 fold. It will be appreciated, as described below, that each rendering operation may comprise multiple rendering processes, to take into account depth of field.

A yet further advantage that may be attained in preferred embodiments is that orthographic projection may allow depiction of objects both behind and in front of the display plane whereas conventional perspective rendering normally can only display objects on one side of the display. This advantageous feature may be provided independently.

Advantageously, the set of orthographic projections are spatially multiplexed to provide a set of micro images, each micro image containing one pixel from each of the projections.

In another aspect, the present invention consists in representation of a 3D scene or model for display utilising 2D display means, comprising a set of 2D images representing respective orthographic projections of the 3D scene or model at respective different angles.

In still another aspect, the present invention consists in a method of processing a viewable representation of a 3D model or scene, comprising the steps of demultiplexing the representation to form a set of orthographic projections corresponding respectively with different viewing angles, and processing each projection.

The invention extends to software and hardware for implementing the aspects and preferred features. Further aspects and preferred features are set out in the claims and/or in the following specific description.

Advantageously, the processed projections are remultiplexed.

The present invention recognises that each pixel underneath a spherical microlens in a true integral image represents the brightness and colour of the scene when viewed from the position of that microlens, at an angle that is a function of the position of the pixel with respect to the focal point of the microlens. We will assume for now that the arrangement of pixels underneath each microlens are the same for all microlenses. Therefore, for example, the top left-hand pixel underneath each microlens corresponds to the light ray leaving the scene at a given angle, and this angle is the same for all top left-hand pixels under all microlenses. The position at which the light ray intersects the display surface varies according to the position of the microlens, but the angle does not vary. Thus, if we were to take the top left-hand pixel from under each microlens and assemble them into an image, we would obtain a kind of image of the scene, similar to that which would be obtained by a camera a very long way away, having a very narrow field-of-view, such that the angle of view was essentially unchanging across the image.

An embodiment of the invention will now be described by way of example with reference to the accompanying drawings.

DESCRIPTION OF THE PREFERRED EMBODIMENT

Figure 1:
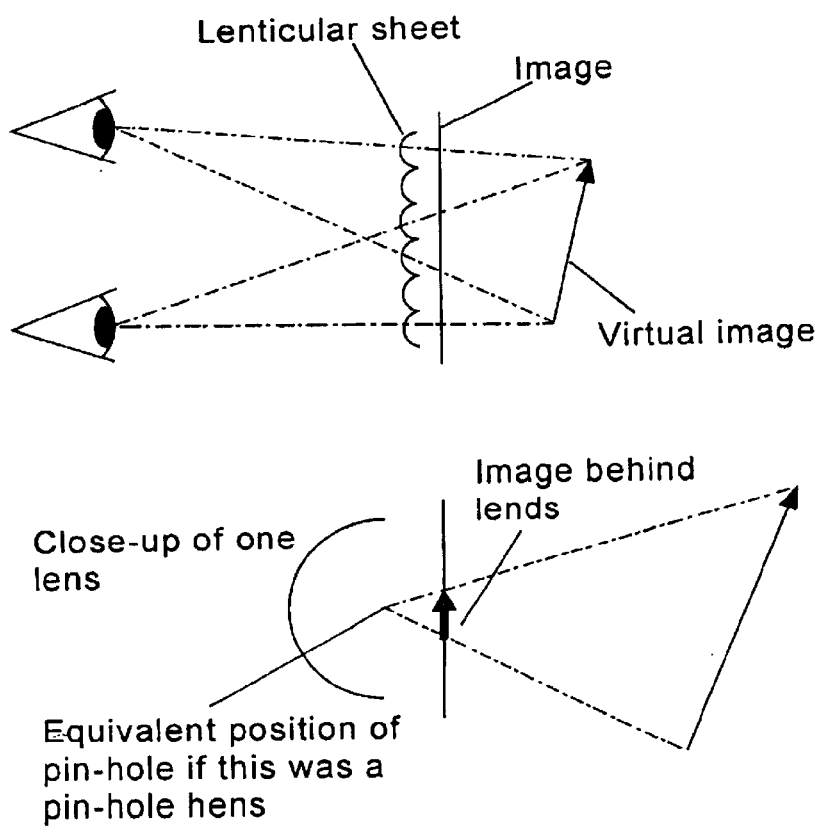
FIG. 1 is a diagram illustrating the known principle of integral image display.

Referring briefly to FIG. 1, this illustrates the known technique mentioned above, in which a special, integral image camera can provide a 2D representation, which when viewed through the matching microlens array, creates a 3D display with full parallax.

Figure 2:
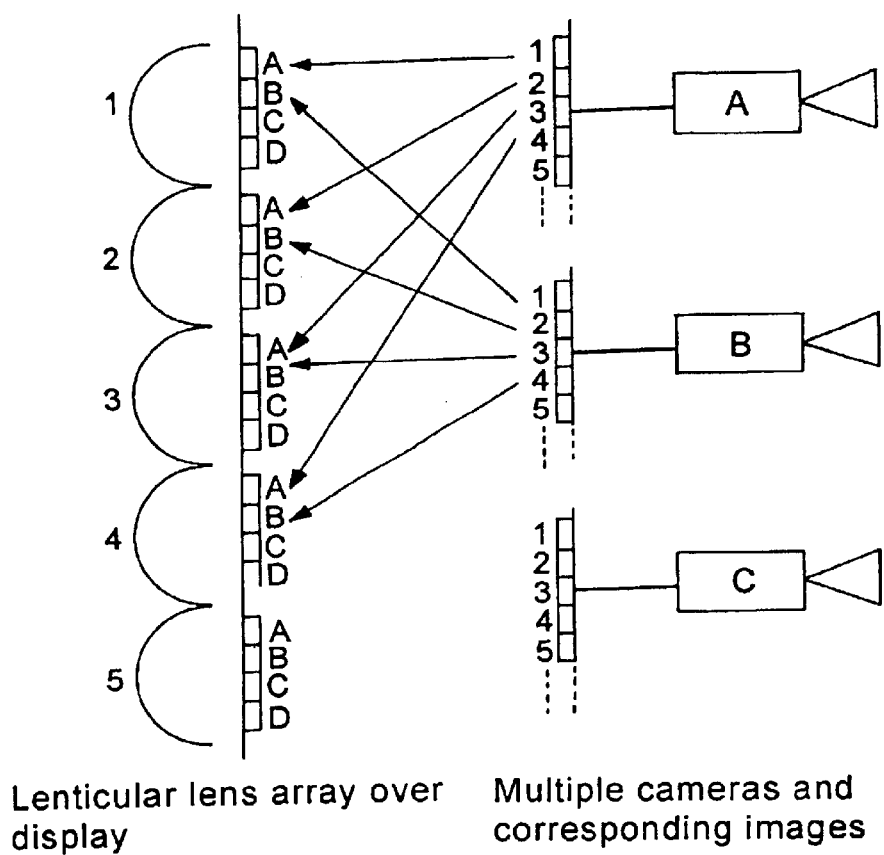
FIG. 2 is a diagram illustrating the known use of multiple cameras to generate a multi-view image viewed through a lenticular screen.

FIG. 2 illustrates the other known technique mentioned above in which multiple cameras are used to generate a multi-view image to be viewed through a lenticular screen.

Figure 3:
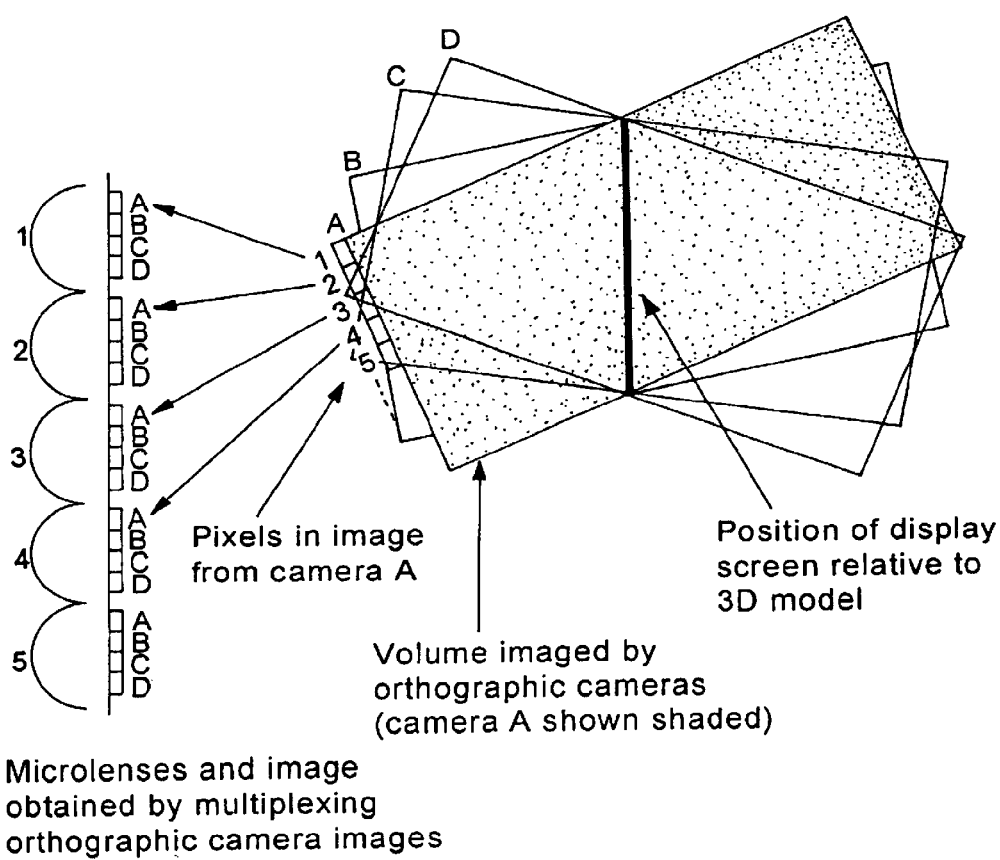
FIG. 3 is a diagram illustrating an embodiment of the present invention.
Figure 4:
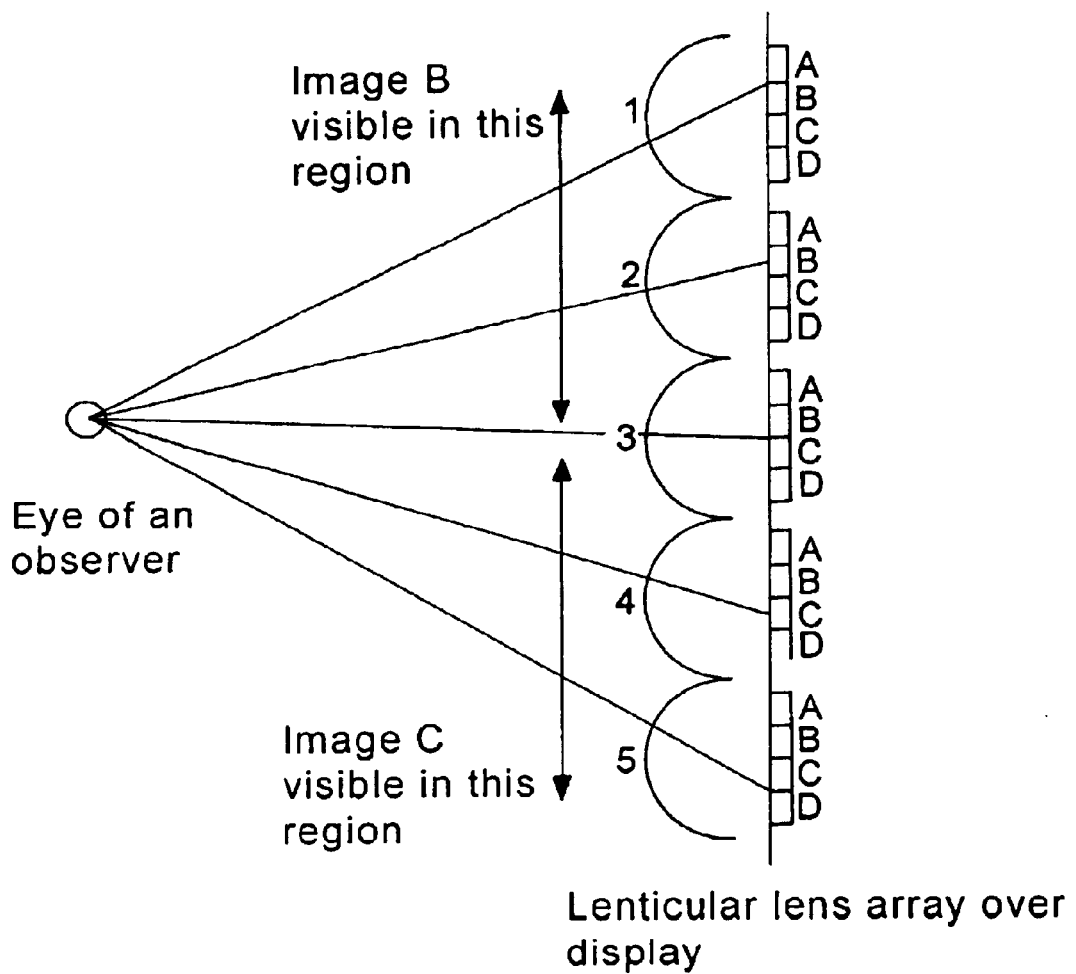
FIG. 4 illustrates the way in which different images on a multi-view display are seen in regions of the display, depending on the angle between the observer and the screen in each region.

A 3D display according to this invention may be realised using an arrangement shown in FIG. 3. The figure shows a cross-section view looking down onto the display; it is assumed that the lenses are spherical, and that the view from the side would look similar. The volume imaged by each orthographic camera is represented as a rectangle. The orientation of each viewing volume corresponds to the angle of view of a particular pixel under each microlens. For example, the orientation of the shaded rectangle, corresponding to 'camera' A, corresponds to the angle at which the pixels labelled 'A' are visible through the microlenses. The width of each view corresponds to the width of the display screen when viewed at that angle. The extent of each viewing volume to the front and behind of the display corresponds to the range of depths between which objects are to be visible. It will be noted that this can extend both in front of and behind the display, whereas this cannot easily be achieved with perspective rendering. Information describing the orientation and size of each viewing volume is given to the computer rendering system in order to allow it to compute each orthographic view. The image computed from the view corresponding to area A in FIG. 3 is shown as a row of pixels on the left-hand side of the viewing volume. These pixels are multiplexed with pixels from the other views and displayed on the appropriate pixels underneath each microlens.

Microlenses in the form of lenticular or convex lenses are described herein for convenience. However, the invention is not limited to such lenses and other means of spatially demultiplexing the display may be used. For example pinholes, diffraction gratings, fresnel lenses and the like may be used and the term microlenses as used herein is intended to encompass any arrangement having the optical properties of varying the pixels presented for view based on the angle at which the image is viewed (i.e. spatially demultiplexing the image). An advantage of pinholes, particularly having a size corresponding to the pixel spacing on the display, is that a smooth transition from one image to another may be obtained. This effect may also be achieved using lenses positioned so that the display is behind the focal point by a small distance to generate a small amount of blurring between pixels. Alternatively, to generate a smooth transition without requiring a large number of rendering operations, the image may be filtered and/or pixels may be interpolated, as described below.

It has been appreciated that it is important to generate an image where the brightness/colour is a function of angle of view and this is conveniently achieved by using spatial demultiplexing as in a conventional multiview image. However, this is not essential and temporal demultiplexing could be used. For example, a high frame rate display could be used in conjunction with a device for projecting the display at differing angles, for example moving mirrors or lenses or moving light sources. In such a case, the different images rendered would be presented sequentially to the display as the effective viewing angle changed. Thus it will be appreciated that references to multiplexing and demultiplexing should not be construed as limited to the spatial multiplexing and demultiplexing shown in the preferred embodiment.

The arrows in FIG. 3 show how the pixel values from view A are used to form the first pixel underneath each microlens; the pixels from view B are similarly used to form the second pixel underneath each lens, and so on. For example, with a regular array of spherical microlenses with a spacing of 8 pixels horizontally and 8 pixels vertically, it would be necessary to render a total of 64 orthographic images. The resolution of each orthographic image would be equal to the number of microlenses in the display.

Orthographic projection, although not previously considered for use in generation of multiview images, has of course previously been considered mathematically and have there exits a well-known method for generating an image of a 3D model held in a computer for which the angle of view is constant for all pixels in the image. Orthographic projection is most commonly used in generating plans, for example of buildings from computer models or other cases where it is desirable for vertical and horizontal lines to appear as such and lines of the same length in the foreground and background to appear the same length rather than background objects appearing smaller as they would in a perspective or "natural" view of the object. Whilst this known use of orthographic projection is of course for a quite different problem, techniques used for such an application may be applied to generate images in embodiments of the invention. Orthographic projection is supported, for example, by the "OpenGL" 3D graphics programming interface, the "Open Inventor" programming API, and many 3D graphics hardware systems. Therefore, embodiments of the present invention can provide through use of orthographic projection, a convenient and efficient method of generating the image to place behind a microlens sheet in order to provide an accurate 3D view of a 3D scene.

The operation of the orthographic camera may be represented as a 4×4 matrix, known as the projection matrix in openGL. This is described, for example, in the "OpenGL Reference Manual", published by Addison-Wesley. The standard form of the matrix used to create an orthographic view is:

| $2/(r-l)$ | 0 | 0 | $T_x$ |
|---|---|---|---|
| 0 | $2/(t-b)$ | 0 | $T_y$ |
| 0 | 0 | $2/(f-n)$ | $T_z$ |
| 0 | 0 | 0 | 1 | where t, b define the positions of the planes at the top and bottom of the viewing volume, being equal to the x values of the top and bottom planes respectively, and the planes being normal to the x (vertical) axis;

l,r define the planes on the left and right of the viewing volume, being equal to the y values of the left and right-hand planes respectively, and the planes being normal to the y axis;

f,n define the planes on the far and near ends of the viewing volume, being equal to the z values of the far and near planes respectively, and the planes being normal to the z axis. The camera is positioned at the origin, looking along the z axis in the direction of −ve z. In accordance with the usual convention in OpenGL.

$T_x = -(r+l)/(r-l)$ $T_y = -(t+b)/(t-b)$ $T_z = -(f+n)/(f-n)$

This matrix premultiplies the coordinates of points in the 3D model being viewed, these points being represented in homogeneous coordinates as a vector of the form $[x, y, z, 1]^T$. So a point (x, y, z) is transformed to the position $((2x-r-l)/(r-l), (2y-t-b)/(t-b))$ in the rendered image, with x coordinates ranging from −1 on the left of the image to +1 on the right, and y ranging from −1 at the bottom to +1 at the top. Note that the coordinates of the point in the image are independent of z; this is the fundamental characteristic of an orthographic projection.

Although the best quality 3D images are likely to be obtained by using spherical microlenses, an alternative arrangement is to use cylindrical microlenses, for example as used in the multiview LCD system shown in FIG. 2. This provides parallax only in the horizontal direction (if the lenticular lenses run vertically). However, lenticular lenses are cheaper and easier to manufacture than spherical microlens arrays, and may be preferable in some applications.

The invention may also be used to generate images for such lenticular lens displays, by using a virtual camera which exhibits the properties of an orthographic camera in the horizontal direction, and behaves like a perspective camera in the vertical direction. This may be achieved by using the expression for the y display coordinate given by the conventional perspective camera transformation (see the OpenGL Reference manual), i.e.

$$y=(-2ny/z+t+b)/(b-t)$$

Note that such a combined orthographic/perspective transformation cannot be implemented by multiplication with a viewing matrix, since the perspective transformation requires that the w coordinate of the transformed point (the 4th component of the position, in homogeneous coordinates) be equal to the depth value of the point (which is −z, since the camera looks in the direction of the negative z axis). OpenGL divides the transformed x, y, z coordinates by w to obtain screen coordinates; this allows the size of objects to appear inversely proportional to their distance from the camera. In this application, we require this division to happen for the y coordinate, but not the x coordinate. Therefore, the transformation we require in this case would have to be implemented by special-purpose hardware or software since OpenGL divides all coordinates by w.

Alternatively, when generating images for a lenticular display, it is possible to use a conventional orthographic transformation to render the set of images, although it is appreciated that the image will not appear exactly right. Each orthographic image may be rendered with a vertical angle of view set to correspond to the most likely vertical angle of view, for example zero (viewing the screen at right angles). The display will then appear to show images which have the characteristics of orthographic images in the vertical direction (e.g. the height of objects will not change with their distance from the viewer), whilst appearing correct in the horizontal direction. In some circumstances, this will be acceptable behaviour. It is noted that with a lenticular autostereoscopic display, it is generally not possible to account correctly for changes in the vertical position of the viewer (this applies to conventional lenticular displays), regardless of how the images are generated, so at best a lenticular display will only give fully correct images for viewpoints at a given height. Thus the imperfection in the method of the embodiment can be tolerated under similar circumstances to imperfections in existing lenticular display applications.

In some applications, the arrangement of pixels underneath the microlenses may vary across the display, for example if the spacing between lenses is not an integer multiple of the pixel spacing. In this case, the orthographic cameras may be used to generate images on a regular pixel lattice under each lens, and the resulting image data, after multiplexing, may be resampled using conventional filtering and sampling techniques. If the microlenses themselves are arranged in some way other than on a rectangular lattice, such as a hexagonal pattern, then the orthographically-rendered images may be resampled to provide pixel data at locations corresponding to the positions of the lenses, before the data is multiplexed to place under the microlenses. Alternatively, the lattice of microlens positions may be broken down into several subsets of points on a square lattice, and several sets of orthographic images may be rendered, to correspond to the lens positions in each lattice.

Filtering and resampling of the image data before or after multiplexing may also be used to apply 'anti-aliasing'. For example, the orthographic images may be rendered to a higher resolution than that corresponding to the number of microlenses in the image, and each orthographic image may be low-pass filtered and resampled to the required resolution, before the pixels are multiplexed. More orthographic images than there are pixels under each lens may be rendered, and the images under each microlens (after the pixels are multiplexed), may be low-pass filtered and resampled. Either or both of these approaches may be used to obtain higher quality images.

It has further been appreciated that there is normally a limit to the rate of change of brightness with viewing angle that a display such as this can provide in a satisfactory manner. Generally, the main limitation will come from the limited number of pixels under each lens, but other effects such as diffraction and spherical aberration will also contribute. If the display attempts to reproduce a high rate of brightness change by having large differences between adjacent pixels under a lens, then the effect will be to introduce a noticeable 'jump' in the observed image as the viewing position is moved. This can be thought of as an aliasing process, due to having too low a sample density. It is therefore desirable to generate images in which the rate of change of brightness is limited, to avoid noticeable jumps between images corresponding to adjacent pixels; the feature of limiting the rate of change of brightness between pixels may be provided independently. This can advantageously be achieved by applying a spatial low-pass filter to each orthographically-rendered image, before the images are multiplexed. However, the degree of filtering that is required is preferably dependant on the depth of the object in the image, in the same way that the depth-of-field of a normal camera introduces blurring that depends on the distance from the object to the camera.

Figure 5:
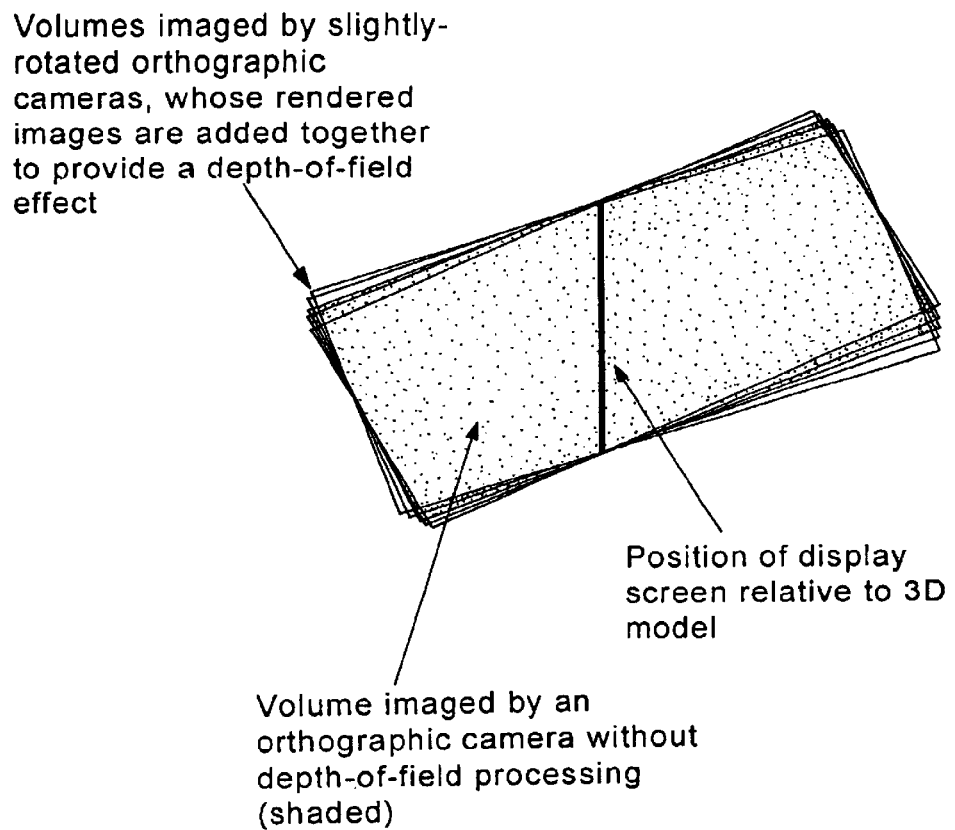
FIG. 5 illustrates how multiple orthographic images may be rendered for a range of angles close to the central angle for a particular view, so that the images may be added together to generate an image whose resolution reduces according to the distance of objects from the display screen.

In order to address this problem, it is possible to adapt techniques used to simulate depth-of-field in the computer-rendering of normal perspective images; the simulation of depth-of-field in orthographic projection may be provided independently. To simulate depth-of-field in perspective rendering, a known method is to render a number of views of the scene from different viewing positions across the aperture of the camera being simulated. Each view is rendered with a slightly different viewing angle, chosen so as to make the object that is in focus appear at the same place in each rendered image. The resulting images are added together to yield an image with simulated depth-of-field. To apply this method to the use of orthographic rendering for a 3D display, a number of orthographic images can be rendered for each viewing angle, for viewing angles centred on this angle. This process is shown for one viewing angle in FIG. 5. If the horizontal viewing angles for adjacent pixels are A, A+d, A+2d, A+3d, . . . , then to generate an "anti-aliased" image appropriate for viewing angle A, images should preferably be rendered at a number of horizontal angles ranging from A−d/2 to A+d/2. The number of horizontal viewing angles for which images should be rendered and added together depends on a number of factors including the number of pixels under each lens and the range of depths in the scene. Preferably, at least 4–8 different angles should be used. If the display uses spherical microlenses (or some other method of presenting a different image as a function of vertical viewing angle), then equivalent anti-aliasing processing should be applied vertically as well. For example, 64 different images might be rendered for each view, with 8 horizontal angles and 8 vertical angles. From FIG. 5 it will be apparent that objects positioned close to the plane of the display will appear in essentially the same place in each image, and therefore will not be blurred when the images are added together. Conversely, an object at the far end of the viewing volume will appear in a slightly different place in each rendered image, and therefore be blurred when the images are summed.

It will be appreciated that "depth of field" is not a criterion that naturally applies to orthographic projections; an orthographic projection can be considered to be a view from infinity with all objects at the same depth. Nevertheless, simulating depth of field for an orthographic projection is useful in the present application. This may be provided independently.

Other methods may also be used to reduce the resolution of objects at a large distance from the display. For example, the viewing volume of the orthographic projection could be divided up into a number of zones, by positioning the near and far clipping planes at different locations through the volume. Each zone can be rendered separately, at a different resolution, such that zones containing objects that are further from the plane of the display are rendered at a lower resolution. The images rendered for each zone can be combined, taking care to ensure that objects nearer the front of the viewing zone obscure those in zones further back. This can conveniently be achieved using OpenGL by rendering the furthest zone first, and then rendering subsequent zones into the same frame buffer without first clearing the buffer. The normal process by which values in the Z-buffer are checked to control whether a newly-rendered pixel should be allowed to overwrite one rendered previously will ensure the correct depth priority.

Similar filtering and resampling techniques may be applied to allow the use of a smaller number of orthographically-rendered images than there are pixels under each lens, by interpolating additional pixel values in the images under each microlens. Equally, the resolution of each rendered orthographic image may be lower than the number of microlenses in the image, and additional pixels interpolated in each orthographic image to match the number of microlenses.

The described techniques of filtering and resampling the orthographically-rendered images can be extended to the representations provided by the known "real" integral image camera. Thus, such a representation formed with an N×M array of microlenses can be de-multiplexed to provide a set of orthographic projections. The number of such projections will be determined by the number of pixels under each microlens. The resolution of each projection will be N×M pixels. Each of these demultiplexed projections can then be subjected to a variety of conventional video processing techniques, as if they were true images. It would be possible, for example, by resampling to provide a set of images having different resolution, say P×Q. Remultiplexing would then provide a 2D representation which can be viewed under a P×Q microlens array. In other senses, the availability of demultiplexed orthographic projections will enable types of processing which would otherwise be impossible or impracticable, or will improve significantly the performance of a specific technique. Thus, an orthographic projection will be expected to share the spatial correlation of a real image. Compression techniques such as JPEG and the intra-coding within MPEG should therefore be highly efficient. A compression technique which first demultiplexed the representation into a set of orthographic projections, should therefore be more efficient than one operating on spatial blocks of the representation itself. Related advantages will be found with other spatial processing techniques such as noise reduction. Similar effects should be seen in the temporal correlation of successive pictures. Thus, a succession of orthographic projections can be processed as if it were a video signal.

Although the invention has been described in terms of its application to a display using microlenses, it can be applied to any type of 3D display where each small area of the screen appears to have a brightness and colour that varies as a function of viewing angle. Such displays include those using multiple displays or high frame-rate displays with an associated mechanism to project particular images at particular angles.

A particular application is in the formation of moving 3D images. In such a case, the set of images is generated to form a sequence of images. This can be achieved using a conventional high speed graphics workstation. If the number of viewing angles is relatively small and the display size is not too large, the images may be rendered in real time to produce an acceptable frame rate; otherwise the images may be pre-rendered and stored. The workstation may include a conventional communication interface for receiving data over a network, such as the internet, or a receiver for receiving data over a broadcast link, to produce images for display. Since the hardware may be largely conventional, other than the modifications to the display to effect demultiplexing (e.g. an array of microlenses to effect spatial demultiplexing) it is not depicted.

Whilst the invention finds use in moving images, it is also useful in generating static images, for example advertising, posters, promotional objects and the like. For a static image, processing constraints are less severe and higher resolution output may be more cost-effectively available, for example using colour laser or ink jet printers and so the advance in processing speed may be used to produce physically large images, for example for an advertising hoarding, having a large range of viewing angles. In static images, the microlens array may be laminated onto the printed image representation.

Each feature disclosed herein may be independently provided, unless otherwise stated.

What is claimed is:

1. A method of providing at least one representation of a 3D model, comprising the steps of, for each said at least one representation, identifying a set comprising a first plurality of different viewing angles and rendering from said model a set comprising a second plurality of orthographic projections corresponding respectively with said first plurality of different viewing angles, and multiplexing the set of orthographic projections so that on viewing the orthographic projections from a given viewing angle, the orthographic projections are demultiplexed and portions of different ones of the set of orthographic projections are visible from the given viewing angle to provide the appearance of a perspective image corresponding to that given viewing angle.

2. A method according to claim 1, wherein the set of orthograpic projections is spatially multiplexed to provide a set of micro images, each micro image containing one pixel from each of the projections.

3. A method according to claim 2, further comprising registering the micro images with respective microlenses of a lens array to demultiplex the images.

4. A method according to claim 3, wherein the representation is a hard copy representation.

5. A method according to claim 2 wherein the images are rendered on a 2D display registered with an array of microlenses.

6. A method according to claim 5 wherein the 2D display is selected from the group consisting of a cathode-ray-tube, an LCD panel or plasma panel display.

7. A method according to claim 5, wherein the display is pre-registered with the array of microlenses.

8. A method according to claim 1, further comprising generating a subsequent representation to produce a sequence of representation.

9. A method according to claim 8 wherein the representations are generated at a display site from a sequence of 3D models transmitted from a source over a communication or broadcast link.

10. A method according to claim 8 wherein at least a portion of the representation is pre-generated at a source and transmitted over a communication or broadcast link to a display site.

11. A method according to claim 1 wherein the number of rendering operations corresponds to the number of viewing angles.

12. A method according to claim 11, wherein the number of rendering operations is less than the number of pixels in an individual image.

13. A method according to claim 1 wherein the 3D object includes elements on both sides of the image plane.

14. A method according to claim 1, further comprising presenting the images for view so that an image appearing to have perspective qualities is formed from portions of a plurality of different ones of said orthographic projections.

15. A method according to claim 1 further comprising filtering the images to reduce sudden variation in brightness as viewing angle changes.

16. A computer program or computer program product containing instructions for carrying out a method according to claim 1.

17. A method of processing a viewable representation of a 3D model or scene, comprising the steps of, for each representation, demultiplexing the representation to form a set comprising a plurality of orthographic projections corresponding respectively with a plurality of different viewing angles, and processing each of said plurality of projections.

18. A method according to claim 17, wherein the processed projections are remultiplexed.

19. A display device for providing a representation of a 3D model, comprising a processor for rendering from said model, for each said representation, a set comprising a plurality of orthographic projections corresponding respectively with a set comprising a plurality of different viewing angles, a multiplexer for multiplexing said set of orthographic projections, a display element for producing a visible display of the representation, and a demultiplexer for demultiplexing the representation so that on viewing the set of orthographic projections from a given viewing angle portions of different ones of the set of orthographic projections are visible from the given viewing angle to provide the appearance of a perspective image corresponding to that given viewing angle.

20. A display device according to claim 19 wherein the display element is substantially flat.

21. A display device according to claim 20, wherein the set of orthograpic projections are spatially multiplexed to provide a set of micro images displayed on the display element, and wherein the demultiplexer comprises a plurality of microlenses registered with the micro images.

22. A display device according to claim 21, wherein each micro image comprises a single pixel from each orthographic projection.

23. A display device according to claim 19 further comprising means for receiving the 3D model or a representation over a communication link.

24. A method of providing at least one representation of a 3D model, comprising the steps of, for each said at least one representation, identifying a set comprising a first plurality of different viewing angles and rendering from said model a set comprising a second plurality of orthographic projections corresponding respectively with said first plurality of different viewing angles, spatially multiplexing the set of orthograpic projections to provide a set of micro images, each micro image containing one pixel from each of the projections, and registering the micro images with respective microlenses of a lens array to demultiplex the images.

* * * * *